(12) United States Patent
Bulgarelli

(10) Patent No.: US 12,288,353 B2
(45) Date of Patent: Apr. 29, 2025

(54) METHOD AND A SERVER FOR FACILITATING PROVISION OF FOOD PRODUCT INFORMATION

(71) Applicant: Tetra Laval Holdings & Finance S.A., Pully (CH)

(72) Inventor: Daniele Bulgarelli, San Martino (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 115 days.

(21) Appl. No.: 18/002,644

(22) PCT Filed: Jun. 30, 2021

(86) PCT No.: PCT/EP2021/067997
§ 371 (c)(1),
(2) Date: Dec. 20, 2022

(87) PCT Pub. No.: WO2022/003023
PCT Pub. Date: Jan. 6, 2022

(65) Prior Publication Data
US 2023/0237710 A1    Jul. 27, 2023

(30) Foreign Application Priority Data
Jul. 3, 2020    (EP) .................................... 20183988

(51) Int. Cl.
*G06T 7/73* (2017.01)
*G06K 7/14* (2006.01)
(Continued)

(52) U.S. Cl.
CPC ................ *G06T 7/73* (2017.01); *G06T 7/74* (2017.01); *G06T 11/00* (2013.01); *G06T 19/006* (2013.01);
(Continued)

(58) Field of Classification Search
CPC ... G06T 7/73–74; G06T 11/00; G06T 19/006; G06T 2207/30204; G06V 10/245; G06V 20/20; G06K 7/1417
See application file for complete search history.

(56) References Cited

U.S. PATENT DOCUMENTS

| | | | |
|---|---|---|---|
| 9,711,182 B2 * | 7/2017 | Dharssi | ................ H04N 21/812 |
| 10,424,121 B1 * | 9/2019 | Melinek | ................ G06T 19/006 |
| 2023/0156088 A1 * | 5/2023 | Berliner | ................ G06F 3/0346 |
| | | | 345/156 |

FOREIGN PATENT DOCUMENTS

| | | |
|---|---|---|
| JP | 2019192091 | 10/2019 |
| KR | 20150029257 | 3/2015 |
| KR | 20200036314 | 4/2020 |

OTHER PUBLICATIONS

Max Dawes: "Judging a product by it's cover—the outside actually counts as well", Sep. 20, 2018 (Sep. 20, 2018), XP0557551 40, Retrieved from the Internet: URL:https://web.archive.org/web/20180920151940/http:// www.zappar.com/blog/judging-a-product-by-its-cover/ [retrieved on Nov. 30, 2020] (Year: 2018).*

(Continued)

*Primary Examiner* — Wesner Sajous
(74) *Attorney, Agent, or Firm* — Knobbe, Martens, Olson, & Bear, LLP

(57) ABSTRACT

A method for facilitating provision of food product information is provided. The method comprises providing a food package, wherein the food package is provided with a visual marker, capturing, by a camera of a user device, authentic image data depicting the visual marker, extracting marker data from the authentic image data, retrieving artificial image data linked to the marker data from an artificial image database, wherein the artificial image data depicts at least one food product component of a food product held in the food package, determining an artificial image spatial refer- (Continued)

ence point based on the visual marker, generating augmented image data by combining the authentic image data, the artificial image data and the artificial image spatial reference point, providing the augmented image data to a screen of the user device.

18 Claims, 5 Drawing Sheets

(51) Int. Cl.
  *G06T 11/00* (2006.01)
  *G06T 19/00* (2011.01)
  *G06V 10/24* (2022.01)
  *G06V 20/20* (2022.01)
(52) U.S. Cl.
  CPC ............ *G06V 10/245* (2022.01); *G06V 20/20* (2022.01); *G06K 7/1417* (2013.01); *G06T 2207/30204* (2013.01)

(56) References Cited

OTHER PUBLICATIONS

Vladimir et al., "Augmented Reality in food production traceability-use case", IEEE, Eurocon 2019—18th International conference on smart technologies, pp. 1-5, XP033627661, DOI: 10.1109/Eurocon.2019.8861734section IV. Mobile App development (Year: 2019).*
International Search Report and Written Opinion in International Application No. PCT/EP2021/067997 dated Oct. 1, 2021 in 12 pages.
Dawes, Matt: "Judging a product by it's cover—the outside actually counts as well", Sep. 20, 2018, XP055755140, Retrieved from the Internet: URL: https://web.archive.org/web/20180920151940/http://www.zappar.com/blgo/judging-a-product-by-its-cover.
Zappar: "Augmented Reality for Packaging—Showcase", Feb. 2, 2018, p. 1, XP054981152, Retrieved from the Internet: URL: https://www.youtube.com/watch?v=Tx1xKAwLvD4.
Zappar: "Augmented Reality for Packaging—SIG x Zappar", May 23, 2016, p. 1, XP054981153, Retrieved from the Internet: URL: https://www.youtube.com/watch?v=Hkg2XcV6MMU.
Zappar: "Zappar: How Our Tech Works", Jul. 21, 2019, XP055755151, Retrieved from the Internet: URL: https://web.archive.org/web/20190721194531/https://www.zappar.com/how-it-works/.
Todorovic, Vladimir, et al.: "Augmented Reality in Food production traceability—use case", IEEE Eurocon 2019—18th International Conference on Smart Technologies, IEEE, Jul. 1, 2019, pp. 1-5, XP033627661, DOI: 10.1109/Eurocon.2019.8861734 section IV. Mobile App Development.
"The camera app in iOS 11 supports reading QR codes", applech2.com, https://web.archive.org/web/20171003204025/https://applech2.com/archives/ios11, as archived Oct. 3, 2017, in 5 pages, w/English Translation.

* cited by examiner

METHOD AND A SERVER FOR FACILITATING PROVISION OF FOOD PRODUCT INFORMATION

TECHNICAL FIELD

The invention relates to software technology within the food processing and packaging industry. More particularly, it is related to methods and servers for facilitating provision of food product information.

BACKGROUND ART

Today within the food processing industry, information regarding products are, in accordance with legislation, provided as printed text on the food package. This type of information may be important to the consumer. For instance, it may contain information about the contents of the product which may be important to know in regards to food preference or allergies. It may also contain information regarding expiration date which may be important in regards to the state of the product.

However, this type of information is often difficult to access. It often requires examining multiple sides of the food package before the information has been located. Furthermore, due to the small font it may be written in, it can be hard for people with reduced sight, such as elderly people, to read it.

In light of the above, there is a need for improved ways to present food product information to the consumer such that the consumer can be well aware of what food product that is provided in the package.

SUMMARY

It is an object of the invention to at least partly overcome one or more of the above-identified limitations of the prior art. In particular, it is an object to provide a method for facilitating provision of food product information.

Generally, it has been realized that the use of augmented image data allows for facilitating provision of food product information. Having the possibility to add artificial image data to authentic image data provides namely for that consumers that cannot read, or in any other way not grasp food product information printed on the package, can access this information, which can in turn reduce a risk that a food product containing e.g. nuts is consumed by a consumer with nut allergy.

According to a first aspect it is provided a method for facilitating provision of food product information, said method may comprise providing a food package, wherein the food package may be provided with a visual marker, capturing, by a camera of a user device, authentic image data depicting the visual marker, extracting marker data from the authentic image data, retrieving artificial image data linked to the marker data from an artificial image database, wherein the artificial image data may depict at least one food product component of a food product held in the food package, determining an artificial image spatial reference point based on the visual marker, generating augmented image data by combining the authentic image data, the artificial image data and the artificial image spatial reference point and providing the augmented image data to a screen of the user device.

The visual marker should be interpreted as an identifiable marker of a predetermined size. It could be a simple shape or a complex image.

The food product component should be interpreted as an ingredient of a food product. As a non-limiting example, a food product component may be water, sugar or salt. It may also be in a processed or un-processed form such as either crushed tomatoes or fresh tomatoes.

The artificial image data may also be a text and or text and image in combination. For instance, the artificial image data may comprise an image depicting three oranges, which can be a number of oranges used for producing juice held in the package. Alternatively, the artificial image data may be a text "3 ORANGES" that may be presented next to the package in the augmented image data. Still an option is that the both three oranges and the text is presented next to the package in the augmented image data.

A food product may comprise one food product component, an example of which may be milk. A food product may also comprise multiple food product components, an example of which may be soda, which may comprise the food product components carbonated water, sugar, flavourings and food colouring.

An advantage of the proposed method may be that food product information may be accessed without having to identify where on the package it is written. Furthermore it is possible to visualize the product without having to open the package. Since the food product information is restricted to space available for printing on the food package, this method provides for that that large text that is easy to read can be used also for small portion packages.

The method may further comprise extracting spatial measurement data from the authentic image data, wherein the spatial measurement data is linked to measurements of the food package and/or measurements of the visual marker, generating calibrated artificial image data by performing a spatial calibration of the artificial image data by comparing the spatial measurement data with spatial reference data linked to the food package and/or linked to the visual marker, provided by a spatial reference database, wherein the augmented image data is generated by combining the authentic image data, the calibrated artificial image data and the artificial image spatial reference point.

In other words, the spatial measurement data may be described as geometrical measures of an object determined from an image of the object. In contrast, spatial reference data may be described as geometrical measures determined by measuring the actual object.

An advantage of the steps of generating calibrated artificial data may be that the augmented image data may be scaled to fit with the authentic image data.

The method may further comprise, in the step of providing a food package, providing an additional food package, wherein the additional food package may be provided with an additional visual marker, wherein the authentic image data depicts the visual marker and the additional visual marker, wherein the marker data may be based on the visual marker and the additional visual marker, wherein the artificial image data may depict at least one food product component of a food product held in the food package and at least one additional food product component of an additional food product held in the additional food package, and wherein the artificial image spatial reference point may be based on the visual marker and the additional visual marker.

An advantage of providing an additional package may be that a mix of the food products held in the food packages may be illustrated in the augmented image data.

The spatial measurement data may be linked to measurements of the food package, measurements of the additional food package, measurements of the visual marker and/or measurements of the additional visual marker, and the spatial reference data may be linked to the food package, the additional food package, the visual marker and/or the additional visual marker.

An advantage of this may be that in the case of an additional food package, the augmented image data may be calibrated to both the food package and the additional food package.

The method may further comprise providing a physical container, such as a bowl, wherein the authentic image data may further depict the physical container, determining geometric data for the physical container in the authentic image data, generating adjusted artificial image data by adjusting the artificial image data based on the geometric data for the physical container, and generating the augmented image data by combining the authentic image data, the adjusted artificial image data and the artificial image spatial reference point.

The geometric data may be determined by comparing the spatial reference data linked to the food package and/or linked to the visual marker, with the physical container.

The visual marker may be provided on a side of the food package, together with a two-dimensional code, such as a QR-code. This may be advantageous in that the visual marker and the two-dimensional code may be captured in the same image.

The two-dimensional code may be configured to launch an application on the user device. The launch of an application on the user device may be to open a web page in a web browser on the user device. This may be an advantage since no pre-installed application is required.

The two dimensional code may further be configure to give instructions to the user to move the camera backwards, if the code is scanned close to the camera. This way a larger field of view may be obtained.

The two-dimensional code may comprise a unique identifier of the food package. This may be advantageous in that food product information that are relevant to a specific package, such as expiry data, may be provided in the augmented image data.

The visual marker may be comprised in a décor of the food package. The décor of the food package should be interpreted as the printed surface of the package, on which consumer directed information, such as name of the product, is provided. This may be advantageous since no additional marker has to be printed on the food package. In other words, the printing process does not have to be altered. Further, by having less non-consumer directed information, such as a bar code, more space of the package can be used for consumer directed information. Further, by having the visual marker "hidden" in the décor, there is less risk of counterfeit production or other types of fraud. Put differently, by not stating where and how the visual marker is provided on the package, this will be more difficult to copy or unduly amend.

The artificial image data may depict the food product in a first form and the food product may be held in the food package in an second form. A first volume of the food product in the first form may be different from a second volume of the food product in the second form. To depict the food product in different forms may be advantageous since it for instance allows the user to see how full a bowl would be after the food product has been processed, which aids the user in the choice of bowl.

The artificial image data may depend on a geographical position of the user device. This may be an advantage since it may be possible to provide different augmented image data depending on where the food package is located.

The artificial image data may depend on a personal profile of the user. The personal profile may comprise user set data for different food product components. This may be an advantage since it allows for providing food product information relevant to a specific user. For instance it may be food product information regarding possible food product components that the user is allergic to. Another advantage may be that the user may choose what information they want to be presented. For instance they may want to know the contents of the food product and its origin. Or they may want to know the nutrition values and expiry date. To find specific information otherwise would be hard and time consuming.

According to a second aspect, a server configured for facilitating provision of food product information is provided. The server may comprise a transceiver, a control unit and a memory.

The transceiver may be configured to receive marker data and transmit augmented image data to a screen of a user device.

The control unit may be configured to execute a retrieving function configured to retrieve artificial image data linked to the marker data from an artificial image database, wherein the artificial image data depicts at least one food product component of a food product held in the food package, a determining function configured to determine an artificial image spatial reference point based on the visual marker, a first generating function configured to generate augmented image data by combining the authentic image data, the artificial image data and the artificial image spatial reference point.

The control unit may further be configured to execute an extracting function configured to extract spatial measurement data from the authentic image data, wherein the spatial measurement data may be linked to measurements of the visual marker, a second generating function configured to generate calibrated artificial image data by performing a spatial calibration of the artificial image data by comparing the spatial measurement data with spatial reference data linked to the visual marker, provided by a spatial reference database.

The authentic image data may further depict a physical container. The control unit may further be configured to execute a second determining function configured to determine geometric data for the physical container in the authentic image data, a third generating function configured to generate adjusted artificial image data by adjusting the artificial image data based on the geometric data for the physical container, and a fourth generating function configured to generate the augmented image data by combining the authentic image data, the adjusted artificial image data and the artificial image spatial reference point.

In addition to the attributes mentioned above, further attributes may be added and used in combination with the attributes mentioned above or separately from the attributes mentioned above.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which.

DETAILED DESCRIPTION

Figure 1:
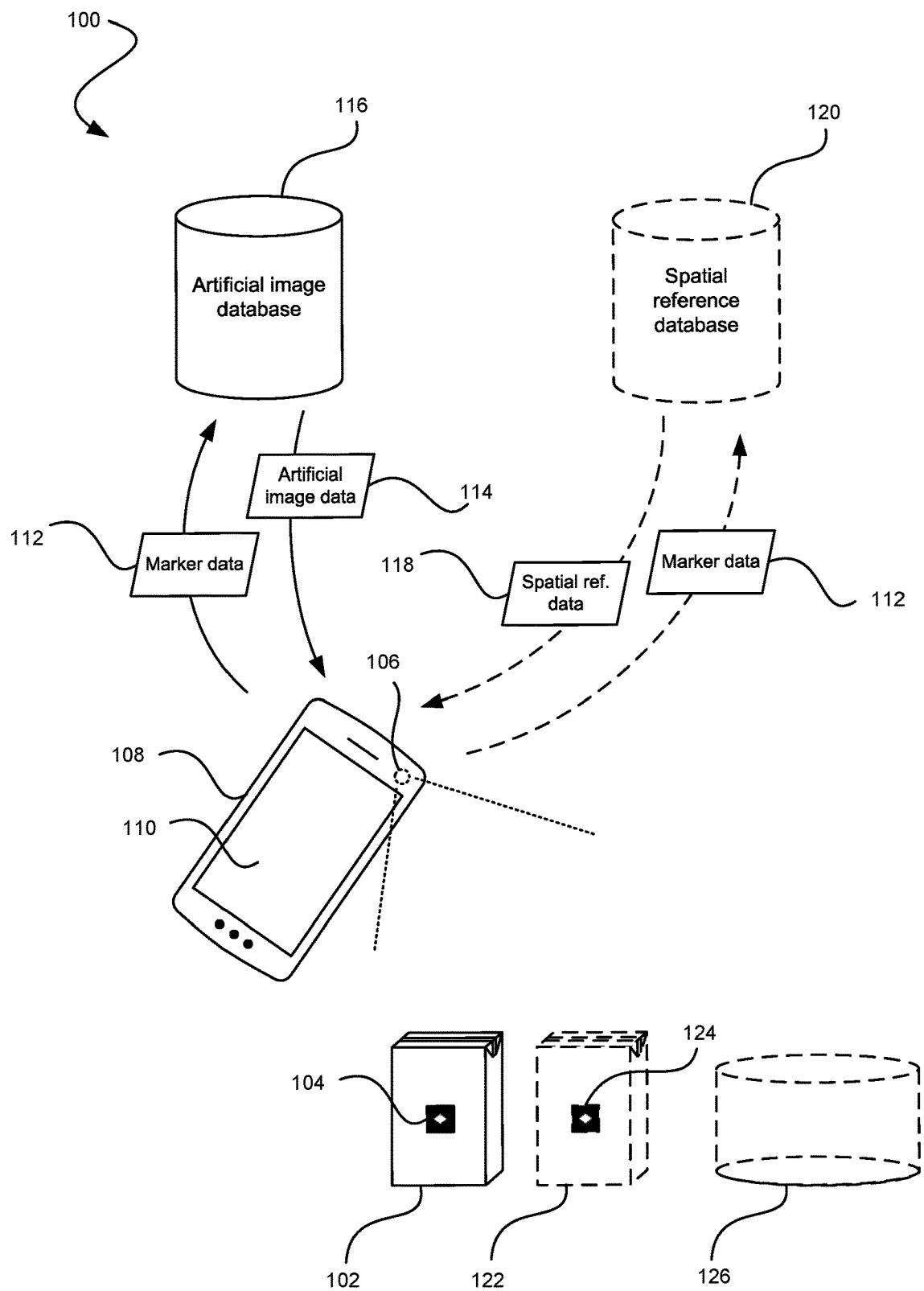
FIG. 1 is a schematic view illustrating a system for facilitating provision of food product information.

FIG. 1 is a schematic view illustrating a system 100 for facilitating provision of food product information by way of example. A food package 102 can be provided. The food package 102 can hold a food product. The food product can comprise one or more food product components. In this example also an additional food package 122 is provided with an additional visual marker 124. It may also be multiple additional food packages. In the case of multiple food packages, two or more food packages may hold the same food product. They may also hold different food products.

A physical container 126 can also be provided, as illustrated in this example. It can also be multiple physical containers provided. A physical container 126 can be a bowl, a pot, a glass, or any other physical container able to hold a food product. The physical container 126 may be different from the food package 102.

The food package 102 can be provided with a visual marker 104. It may also have a two-dimensional code 402, such as a QR-code. The visual marker 104 and two-dimensional code 402 is further described in regard to FIG. 4A to FIG. 4C.

The system 100 can further comprise a user device 108. The user device can be a mobile device such as a smart phone, or a tablet or any other electronic device fit for the purpose. It can also be smart glasses, wherein a screen is incorporated in a lens of the glasses.

The user device 108 can comprise a camera 106. The camera 106 can be provided as an external camera, connected to the user device 108 by suitable means.

The user device 108 can comprise a screen 110. Even though the screen 110 is illustrated as a part of the user device 108, it may be provided as an external screen and connected to the user device 108 by suitable means.

The camera 106 of the user device 108 can be used to capture authentic image data. The authentic image data can depict one or more visual markers 104 that are provided on the food package 102. The authentic image data can further depict one or more food packages. It can also depict one or more physical containers.

Marker data 112 can be extracted from the authentic image data by the user device 108. The marker data 112 can be used to retrieve artificial image data 114 linked to the marker data 112, from an artificial image database 116. The artificial image database 116 can be provided locally on the user device 108. It can also be provided externally to the user device 108. The artificial image data 114 can be illustrations of food product components that a food product held in the food package is comprised of. In other words, it can be illustrations of the contents of the food package 102. It can also be illustrations or videos related to the food package 102, such as a guide on how to open the food package. It can also be illustrations related to the producer, such as a mascot or logotype of the company.

An artificial image spatial reference point can be determined. It can be determined based on a location of the visual marker 104.

Augmented image data can be generated by combining the authentic image data, the artificial image data and the artificial image spatial reference point. The augmented image data can be interpreted as an image showing both real life objects, such as food packages or physical containers, and animated objects from the artificial image database. The artificial image spatial reference point can be used to align the authentic image data and the artificial image data. In a simpler version of the system 100, the step of determining an artificial image spatial reference point can be skipped. Instead, a pre-determined reference point, such as the center of the screen, can be used to know where to place the artificial image data.

The augmented image data may be provided to the screen 110 of the user device 108.

Optionally, a spatial reference database 120 can be provided. The spatial reference database 120 can provide spatial reference data 118 linked to a food package 102 and/or a visual marker 104. The spatial reference data can be geometrical dimensions of the food package or visual marker. To know which package type that is depicted, this information may be linked to the visual marker or other code provided on the package. By knowing which type of package, e.g. Tetra Brik Aseptic 1000 ml Slim, spatial reference data linked to the package being depicted can be retrieved. An advantage of using the package for spatial alignment instead of the visual marker is that the package is larger and as an effect different spatial reference points can be placed further apart, which may provide for improved spatial alignment of the artificial image data and the authentic image data.

Spatial measurement data can be extracted from the authentic image data. The spatial measurement data can be linked to measurements of a food package 102, as described above, and/or measurements of a visual marker 104. Calibrated artificial image data can be generated by comparing the spatial measurement data with the spatial reference data.

The augmented image data may be generated using the authentic image data, the calibrated artificial image data and the artificial image spatial reference point. In this way, the size of an artificial object may be calibrated to match the size of the food package 102 and/or the visual marker 104.

In the case of the physical container 126 being provided in the authentic image data, geometric data of the physical container 126 can be determined, for instance by comparing the physical container 126 to spatial reference data of the food package 102 and/or the visual marker 104.

Figure 2A:
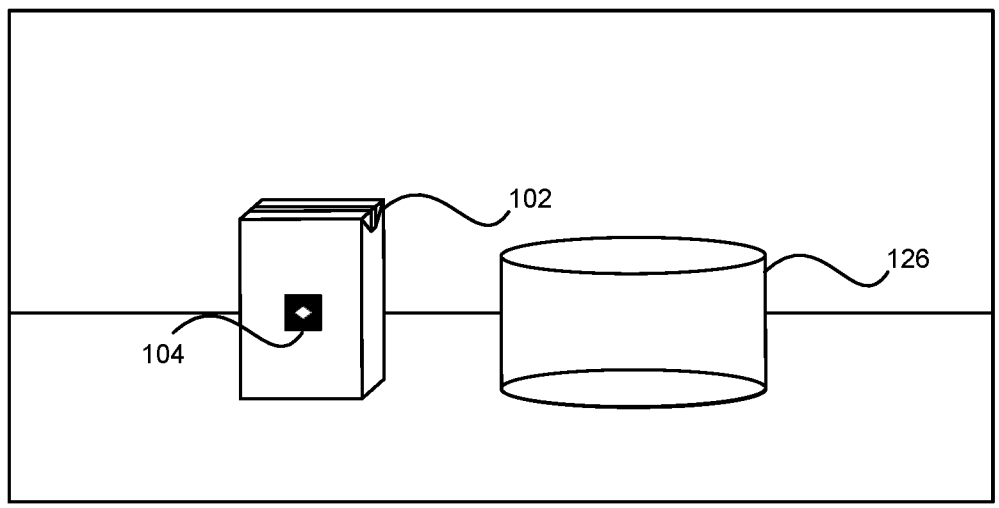
FIG. 2A illustrates an example of a scene with authentic image data.

FIG. 2A illustrates, by way of example, a scene based on authentic image data. In this example the food package 102 with a visual marker 104, and a physical container 126 is visualized.

Figure 2B:
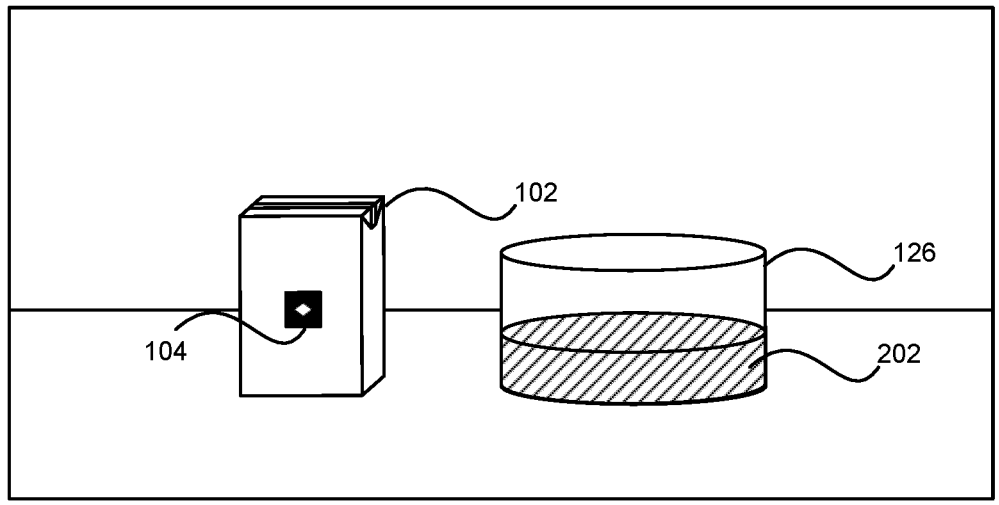
FIGS. 2B and 2C illustrates two examples of scenes with augmented image data.

FIG. 2B illustrates. By way of example, a scene based on augmented image data. It illustrates the food product held in the food package 102 but in the physical container 126 in a first form 202. It could also be illustrated in a second form 205 as in FIG. 2C, which shows the same food package 102 and the same food product but in a second form 204 with a different volume. The first and second form can be interpreted as a processed and un-processed form of the food product.

Figure 2C:
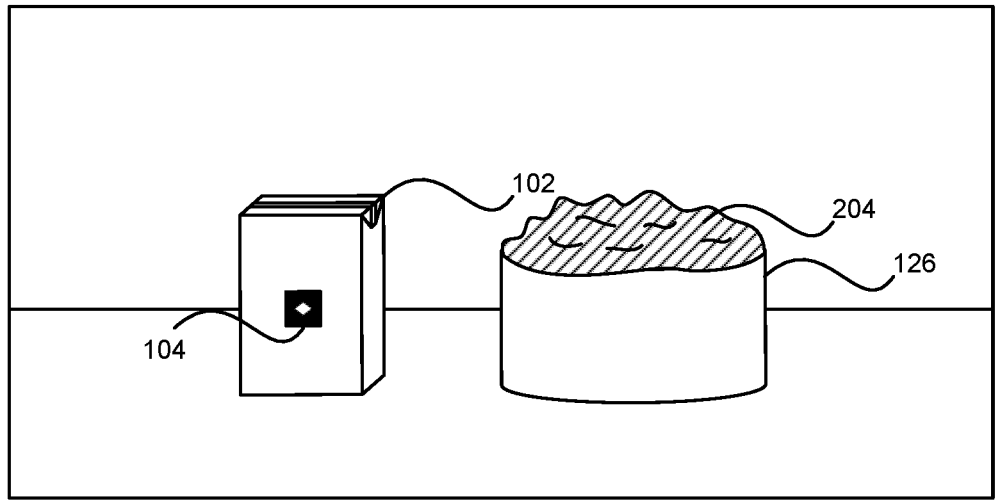

As an example, the food package 102 could be a package of cream. In FIG. 2B the cream is visualized as un-whipped cream. In FIG. 2C the cream is visualized as whipped cream. In this case, the first form 202 of the product has a smaller volume than the second form 204.

As another example, the food package 102 could be a package of orange juice. The first form can be un-processed oranges. The second form can be the processed form of orange juice. In this case, the first form of the product has a larger volume than the second form.

Even though not illustrated in any of FIG. 2A to FIG. 2C the augmented image data can depict food products or food product components of multiple food packages in the same scene. This could be used to illustrate a mix of two food products.

As another example, a food product can be illustrated by the food product components it's comprised of separately.

Figure 3:
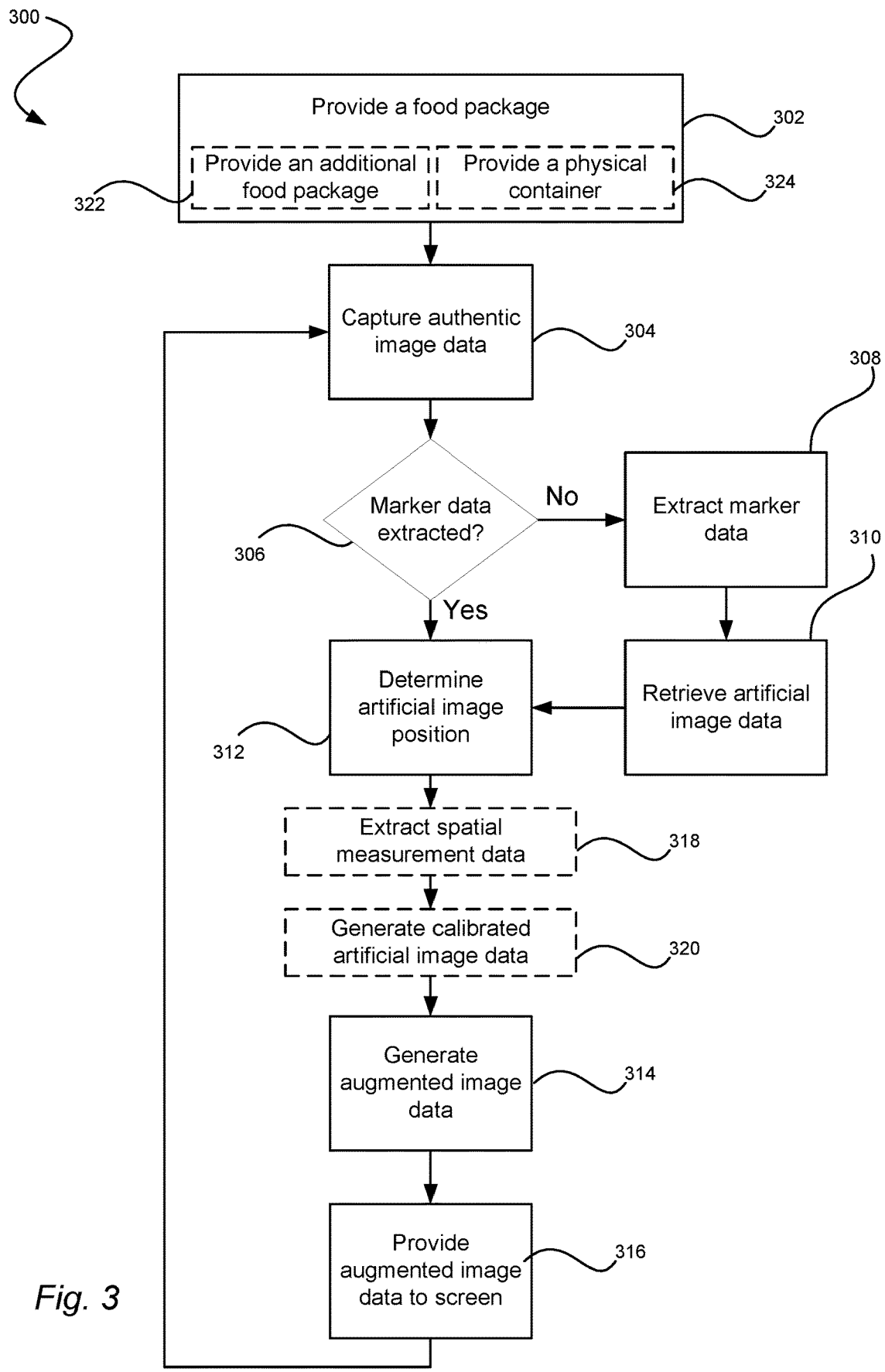
FIG. 3 is a flowchart illustrating the steps of a method for facilitating provision of food product information.

FIG. 3 is a flowchart illustrating the steps of a method 300 for facilitating provision of food product information.

In a first step 302, a food package can be provided, wherein the food package can be provided with a visual marker.

In a second step 304, authentic image data depicting the visual marker can be captured by a camera of a user device.

In a third step 308, marker data can be extracted from the authentic image data.

In a fourth step 310, artificial image data linked to the marker data can be retrieved from an artificial image database, wherein the artificial image data can depict at least one food product component of a food product held in the food package.

Optionally, the third and fourth step can be skipped by checking 306 if marker data already has been retrieved. In this case the method 300 can be repeated continuously, to get a real-time feed of augmented image data on the screen of the user device. In other words, the third step may need to be performed only once. In addition, the fourth step may need to be performed only once.

In a fifth step 312, an artificial image spatial reference point can be determined, based on the visual marker.

In a sixth step 314, augmented image data can be generated by combining the authentic image data, the artificial image data and the artificial image spatial reference point.

In a seventh step 316, the augmented image data can be provided to a screen of the user device.

Optionally, in an eighth step 318, spatial measurement data from the authentic image data can be extracted, wherein the spatial measurement data can be linked to measurements of the food package and/or measurements of the visual marker.

Optionally, in a ninth step 320, calibrated artificial image data can be generated by performing a spatial calibration of the artificial image data by comparing the spatial measurement data with spatial reference data linked to the food package and/or linked to the visual marker, provided by a spatial reference database.

Optionally, in the sixth step 314, the augmented image data can be generated by combining the authentic image data, the calibrated artificial image data and the artificial image spatial reference point.

Optionally, in the first step 302, an additional food package can be provided 322, wherein the additional food package can be provided with an additional visual marker,
  wherein the authentic image data can depict the visual marker and the additional visual marker,
  wherein the marker data can be based on the visual marker and the additional visual marker,
  wherein the artificial image data can depict at least one food product component of a food product held in the food package and at least one additional food product component of an additional food product held in the additional food package,
  wherein the artificial image spatial reference point can be based on the visual marker and the additional visual marker.

The spatial measurement data can be linked to measurements of the food package, measurements of the additional food package, measurements of the visual marker and/or measurements of the additional visual marker. Further, the spatial reference data can be linked to the food package, the additional food package, the visual marker and/or the additional visual marker.

Optionally, in the first step 302, a physical container can be provided 324, wherein the authentic image data further depicts the physical container. Optionally, in a tenth step, geometric data for the physical container in the authentic image data can be determined. Optionally, in an eleventh step, adjusted artificial image data can be generated by adjusting the artificial image data based on the geometric data for the physical container. Optionally, in the sixth step 314, the augmented image data can be generated by combining the authentic image data, the adjusted artificial image data and the artificial image spatial reference point.

Optionally, in the tenth step, the geometric data is determined by comparing the spatial reference data linked to the food package and/or linked to the visual marker, with the physical container.

Figure 4A:
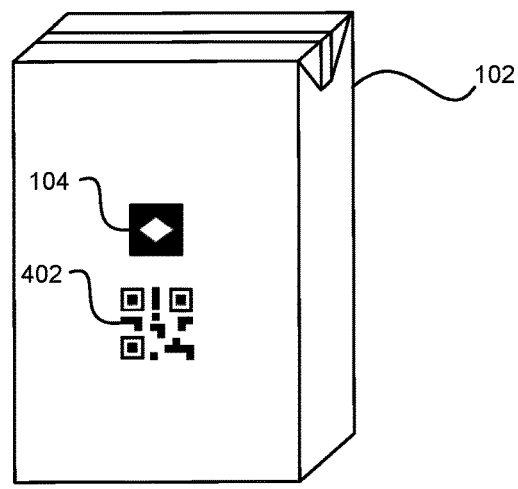
FIG. 4A to 4C illustrates different ways a visual marker can be provided on a food package.
Figure 4B:
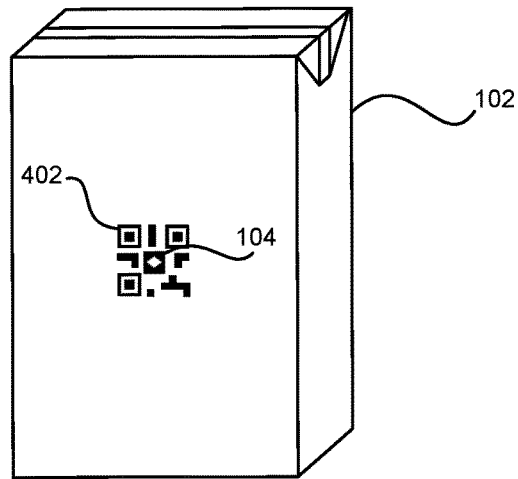
Figure 4C:
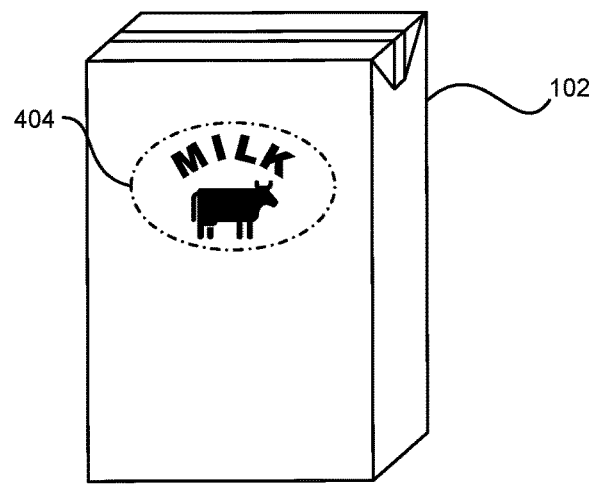

FIG. 4A to FIG. 4C illustrates examples of ways the visual marker 104 can be provided on the food package 102. The visual marker 104 can be provided together with the two-dimensional code 402, such as a QR code, or separately.

FIG. 4A illustrates an example where the visual marker 104 is provided next to the two dimensional code 402 on one side of the food package 102. They can be placed on either side of the food package 102.

FIG. 4B illustrates an example where the visual marker 104 is provided within the two-dimensional code 402.

FIG. 4C illustrates an example where the visual marker 104 is comprised in a décor 404 of the food package 102. In other words, the visual marker 104 can be, for instance, a logo on the package that is already printed on the food package 104.

Figure 5:
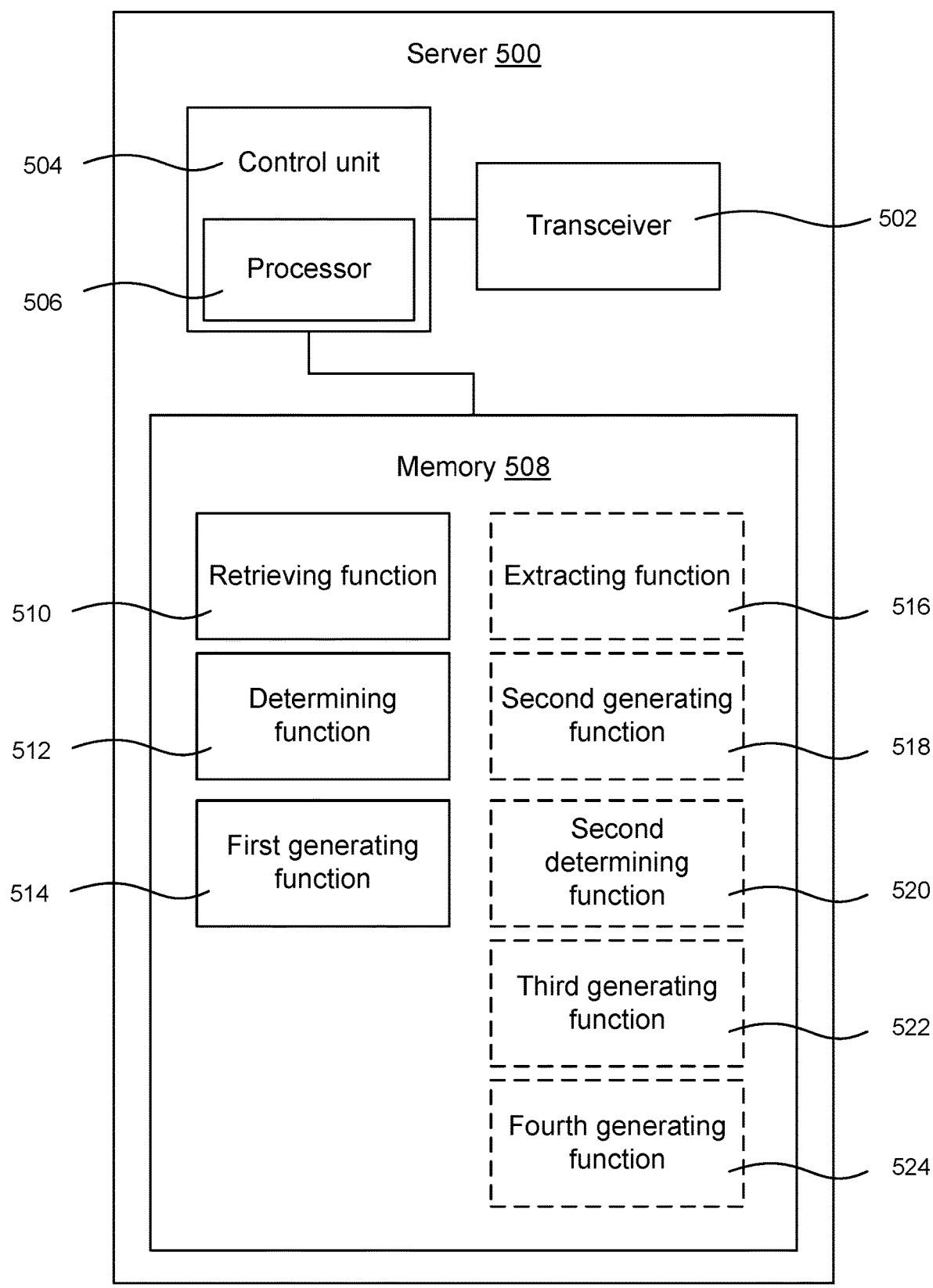
FIG. 5 illustrates a server configured for facilitating provision of food product information.

FIG. 5 illustrates a schematic view of a server 500. The server 500 is configured for facilitating provision of food product information. The server 500 comprises a transceiver 502, a control unit 504 and a memory 508.

The transceiver 502 is configured to communicate with other devices. The transceiver 502 can be configured to receive marker data, and transmit augmented image data to a screen of a user device.

The control circuit 504 can be configured to perform the control of functions and operations of the server 500. The control circuit 504 can include a processor 506, such as a central processing unit (CPU). The processor 506 can be configured to execute program code stored in the memory 508, in order to perform functions and operations of the server 500.

The control circuit 504 can execute a retrieving function 510 configured to retrieve artificial image data linked to the marker data from an artificial image database, wherein the artificial image data can depict at least one food product component of a food product held in the food package.

The control circuit 504 can execute a determining function 512 configured to determine an artificial image spatial reference point based on the visual marker.

The control circuit 504 can execute a first generating function 514 configured to generate augmented image data by combining the authentic image data, the artificial image data and the artificial image spatial reference point.

Optionally, the control circuit 504 can execute an extracting function 516 configured to extract spatial measurement data from the authentic image data, wherein the spatial measurement data is linked to measurements of the visual marker and/or the package depicted in the authentic image data.

Optionally, the control circuit 504 can execute a second generating function 518 configured to generate calibrated artificial image data by performing a spatial calibration of the artificial image data by comparing the spatial measurement data with spatial reference data linked to the visual marker and/or the package, provided by a spatial reference database.

Optionally, the control circuit 504 can execute a second determining function 520 configured to determine geometric data for a physical container in the authentic image data.

Optionally, the control circuit 504 can execute a third generating function 522 configured to generate adjusted artificial image data by adjusting the artificial image data based on the geometric data for the physical container.

Optionally, the control circuit 504 can execute a fourth generating function 524 configured to generate the augmented image data by combining the authentic image data, the adjusted artificial image data and the artificial image spatial reference point.

Optionally, the control circuit 504 can be configured to extract marker data from the authentic image data, by means of an second extraction function.

The server 500 may be provided within the user device.

From the description above follows that, although various embodiments of the invention have been described and shown, the invention is not restricted thereto, but may also be embodied in other ways within the scope of the subject-matter defined in the following claims.

The invention claimed is:

1. A method for facilitating provision of food product information, comprising:
   receiving an authentic image data depicting a visual marker of a food package, the authentic image data captured by a camera of a user device,
   extracting a marker data from the authentic image data,
   retrieving an artificial image data linked to the marker data from an artificial image database, wherein the artificial image data depicts at least one food product component of a food product held in the food package,
   determining an artificial image spatial reference point based on the visual marker,
   extracting spatial measurement data from the authentic image data, wherein the spatial measurement data is linked to measurements of the food package and/or measurements of the visual marker,
   generating calibrated artificial image data by performing a spatial calibration of the artificial image data by comparing the spatial measurement data with spatial reference data linked to the food package and/or linked to the visual marker, provided by a spatial reference database,
   generating an augmented image data by combining the authentic image data, the calibrated artificial image data and the artificial image spatial reference point, and
   providing the augmented image data to be displayed on the user device.

2. The method according to claim 1,
   wherein the authentic image data depicts the visual marker and an additional visual marker of an additional food package,
   wherein the marker data is based on the visual marker and the additional visual marker,
   wherein the artificial image data depicts the at least one food product component of the food product held in the food package and at least one additional food product component of an additional food product held in the additional food package, and
   wherein the artificial image spatial reference point is based on the visual marker and the additional visual marker.

3. The method according to claim 2, wherein the spatial measurement data is linked to measurements of the food package, measurements of the additional food package, measurements of the visual marker and/or measurements of the additional visual marker, and
   wherein the spatial reference data is linked to the food package, the additional food package, the visual marker and/or the additional visual marker.

4. The method according to claim 1, further comprising:
   determining a geometric data for a physical container in the authentic image data, wherein the authentic image data further depicts the physical container,
   generating adjusted artificial image data by adjusting the artificial image data based on the geometric data for the physical container, and
   generating the augmented image data by combining the authentic image data, the adjusted artificial image data and the artificial image spatial reference point.

5. The method according to claim 4, wherein the geometric data is determined by comparing the spatial reference data linked to the food package and/or linked to the visual marker, with the physical container.

6. The method according to claim 1, wherein the visual marker is provided on a side of the food package, together with a two-dimensional code, wherein the two-dimensional code is configured to launch an application on the user device.

7. The method according to claim 6, wherein the two-dimensional code comprises a unique identifier of the food package.

8. The method according to claim 1, wherein the visual marker is comprised in a décor of the food package.

9. The method according to claim 1, wherein the artificial image data depicts the food product in a first form and the food product is held in the food package in a second form, wherein a first volume of the food product in the first form is different from a second volume of the food product in the second form.

10. The method according to claim 1, wherein the artificial image data depends on a geographical position of the user device.

11. The method according to claim 1, wherein the artificial image data depends on a personal profile of a user, wherein the personal profile comprises user set data for different food product components.

12. A server configured for facilitating provision of food product information, the server comprising:
a transceiver, a controller, and a memory,
wherein the transceiver is configured to:
receive a marker data, and
transmit an augmented image data to be displayed on a user device, and
wherein the controller is configured to execute instructions stored in the memory, the instructions causing the controller to:
retrieve an artificial image data linked to the marker data from an artificial image database, wherein the artificial image data depicts at least one food product component of a food product held in a food package provided with a visual marker,
determine an artificial image spatial reference point based on the visual marker,
extract a spatial measurement data from an authentic image data depicting the visual marker, wherein the spatial measurement data is linked to measurements of the visual marker,
generate a calibrated artificial image data by performing a spatial calibration of the artificial image data by comparing the spatial measurement data with spatial reference data linked to the visual marker, provided by a spatial reference database, and
generate the augmented image data by combining the authentic image data, the calibrated artificial image data and the artificial image spatial reference point.

13. The server according to claim 12, wherein the authentic image data further depicts a physical container, and
wherein the controller is further configured to:
determine a geometric data for the physical container in the authentic image data,
generate adjusted artificial image data by adjusting the artificial image data based on the geometric data for the physical container, and
generate the augmented image data by combining the authentic image data, the adjusted artificial image data and the artificial image spatial reference point.

14. A method for facilitating provision of food product information, comprising:
receiving an authentic image data depicting a visual marker of a food package, the authentic image data captured by a camera of a user device,
extracting a marker data from the authentic image data,
retrieving an artificial image data linked to the marker data from an artificial image database, wherein the artificial image data depicts at least one food product component of a food product held in the food package, wherein the artificial image data depicts the food product in a first form and the food product is held in the food package in a second form, and wherein a first volume of the food product in the first form is different from a second volume of the food product in the second form,
determining an artificial image spatial reference point based on the visual marker,
generating augmented image data by combining the authentic image data, the artificial image data and the artificial image spatial reference point, and
providing the augmented image data to be displayed on a screen of the user device.

15. The method according to claim 14, further comprising:
determining a geometric data for a physical container in the authentic image data, wherein the authentic image data further depicts the physical container,
generating adjusted artificial image data by adjusting the artificial image data based on the geometric data for the physical container, and
generating the augmented image data by combining the authentic image data, the adjusted artificial image data and the artificial image spatial reference point.

16. The method according to claim 15, wherein the geometric data is determined by comparing spatial reference data, linked to the food package and/or linked to the visual marker and provided by a spatial reference database, with the physical container.

17. The method according to claim 14, wherein the visual marker is provided on a side of the food package, together with a two-dimensional code, wherein the two-dimensional code is configured to launch an application on the user device.

18. The method according to claim 14, wherein the visual marker is comprised in a décor of the food package.

* * * * *